Patented Aug. 17, 1954

2,686,802

UNITED STATES PATENT OFFICE 2,686,802

DICHLORACETIMINO THIOETHERS AND ACID ADDITION SALTS THEREOF

Ronald Slack, Chelsea, Julius Nicholson Ashley, Upminster, and Samuel Sidney Berg, Shepherds Bush, England, assignors, by mesne assignments, to Parke, Davis & Company, Detroit, Mich., a corporation of Michigan No Drawing. Application December 8, 1950, Serial No. 199,938

Claims priority, application Great Britain August 9, 1950

6 Claims. (Cl. 260—453)

This invention relates to new chemical compounds and to a process for their preparation.

It is the object of the present invention to provide new chemical compounds of value as intermediates for chemical syntheses.

The compounds of the present invention are the dichloracetimino-thio ethers and their acid addition salts. The imino-thio ethers conform to the general formula:

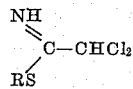

(in which R represents the residue of a mercaptan RSH).

According to a feature of this invention, these new compounds are prepared by treating an anhydrous solution or suspension containing dichloroacetonitrile and a mercaptan R.SH with anhydrous hydrogen chloride or anhydrous hydrogen bromide to form the imino-thio ether hydrohalide, and, if the imino-thio ether base is required, treating the product with an organic base such as pyridine in the absence of water.

That compounds of the aforesaid type can be prepared is surprising. According to the chemical literature (see Hickinbottom, "Reactions of Organic Compounds," page 252) such aliphatic nitriles as dichloro-, trichloro and dichloronitro-acetonitriles which contain two or more chlorine or bromine atoms in the α-position fail to react with alcohols in the presence of anhydrous hydrogen chloride to form the corresponding imino-ethers. Since mercaptans normally behave in a manner analogous to that of alcohols in reactions of this type, one would similarly not expect the corresponding imino-thio ethers to be formed by substituting a mercaptan for an alcohol in the treatment of nitriles of the aforesaid type.

Preferably, in carrying out the process of the invention, the nitrile is dissolved in an anhydrous solvent such as ether containing the mercaptan or to which the mercaptan is then added and the resultant solution is cooled to 0° C. or below and then saturated with dry hydrogen chloride or dry hydrogen bromide. On standing until the reaction is complete, the product either separates out or, if soluble, can be isolated by any conventional technique.

The new imino-thio ethers and their acid addition salts are of particular importance in that they are convenient intermediates for the production of certain important oxazolines which are described in the specification of co-pending application No. 199,939 of even date herewith.

The present invention is illustrated by the following non-limitative example.

Example

A solution of 9.2 g. of dichloroacetonitrile and 6 c. c. of ethyl mercaptan in 50 c. c. of anhydrous chloroform was cooled to −5° C. and saturated with dry hydrogen chloride. After keeping for one week, a trace of solid material was filtered off, and the solution was treated with an equal volume of anhydrous ether. The dichloroacetimino ethyl thio-ether hydrochloride which separated as a solid was collected, washed with anhydrous ether, and dried in vacuo. It had M. P. 125–127° C. (decomp.).

The hydrochloride was converted into the base by treating a finely divided ethereal suspension of the salt with a slight deficiency of dry pyridine. Moisture was rigorously excluded. Pyridine hydrochloride was removed by filtration and, after evaporation of the ether, the residual oil was distilled in vacuo to give the base as a colourless oil, B. P. 90° C./12 mm. with a mild, leek-like odour.

The process hereinbefore described is of general application in that instead of aliphatic mercaptans, of which a lower alkyl in the form of the ethyl compound has been exemplified, cycloaliphatic or aralkyl or heterocyclic compounds containing a mercapto group may be employed. A typical example is benzyl mercaptan. The mercaptan employed may contain substituents provided that these do not interfere with the reaction.

We claim:

1. A compound selected from the class consisting of dichloracetimino thioethers and the hydrochloride and the hydrobromide acid addition salts thereof.

2. Dichloroacetimino thio ethyl ether.

3. Dichloroacetimino thio ethyl ether hydrochloride.

4. Process which comprises saturating a solution of dichloracetonitrile and a mercaptan in an anhydrous solvent cooled to below 0° C. with a compound selected from the class consisting of dry hydrochloride and dry hydrobromide and separating therefrom dichloracetimino thio ether acid addition salt.

5. Process according to claim 4 in which the resulting product is treated with dry pyridine in the absence of water to obtain dichloracetimino thio ether.

6. Process which comprises saturating a solution of dichloracetonitrile and ethyl mercaptan in anhydrous chloroform cooled to below 0° C. with dry hydrogen chloride, and adding an equal volume of anhydrous ether, thereby precipitating dichloracetimino thio ethyl ether hydrochloride.

References Cited in the file of this patent

Schmidt, Berichte, vol. 47, pages 2545–2550 (1914).

Steinkopf et al., Berichte, vol. 56B, pages 1930–1932 (1923).